United States Patent

[11] 3,567,970

[72] Inventor Ted W. Berwin
Los Angeles, Calif.
[21] Appl. No. 754,867
[22] Filed Aug. 23, 1968
[45] Patented Mar. 2, 1971
[73] Assignee the United States of America as represented by the Secretary of Navy

[54] DIRECT CURRENT COUPLER
5 Claims, 2 Drawing Figs.

[52] U.S. Cl. .......... 307/254, 307/229, 315/22
[51] Int. Cl. .......... H03k 17/00
[50] Field of Search .......... 307/296, 297, 246, 229, 254; 315/22, 30

[56] References Cited
UNITED STATES PATENTS

| | | | |
|---|---|---|---|
| 3,292,010 | 12/1966 | Brown et al. | 307/246 |
| 3,333,117 | 7/1967 | Carter | 307/229 |
| 3,465,167 | 9/1969 | Hollins | 307/229 |

*Primary Examiner*—Donald D. Forrer
*Assistant Examiner*—B. P. Davis
*Attorneys*—G. J. Rubens, Arthur L. Branning and T. O. Watson, Jr.

ABSTRACT: This invention is directed to a direct current coupling circuit which couples a voltage signal from one DC level to another. The circuit utilizes an operational amplifier and a resistive-capacitive network connected to the output of the amplifier. The shift in DC level is provided by a DC potential which is connected across one of the capacitors in the resistive-capacitive network. Connection of this potential is achieved by means of a high-speed switching circuit.

INVENTOR
TED W. BERWIN

BY [signature]
ATTORNEY

DIRECT CURRENT COUPLER

STATEMENT OF GOVERNMENT INTEREST

The invention defined herein may be manufactured and used by or for the Government of the United States of America for Governmental purposes without the payment of any royalties thereon or therefor.

BACKGROUND OF THE INVENTION

1. Field of the Invention

This invention relates to a direct current coupling circuit. The circuit couples a voltage signal from a low DC level to a high DC level. The circuit generally is used to drive the grid circuit of a cathode ray storage tube.

2. Description of the Prior Art

Transformer-rectifier systems have been used in the prior art to achieve high level DC coupling. The components utilized are expensive and bulky and are subject to frequent failure of the transformers. Furthermore, this system introduces harmonics into the circuit.

SUMMARY OF THE INVENTION

This invention represents a substantial improvement over the prior art. The system is simple and inexpensive to construct. The capacitors utilized are small. The system is highly efficient and does not generate unnecessary harmonics.

The inventive circuit utilizes an operational amplifier for receiving a sinusoidal input signal. A first capacitor is connected in series between the output of the amplifier and the output of the circuit. A second capacitor is connected in series with a resistor and in parallel with the first capacitor. A high speed transistorized switching circuit cyclically connects a potential across the second capacitor to provide the DC level shift to the output of the operational amplifier.

It is an object of this invention to provide a new and improved DC coupler.

It is a further object of this invention to provide a DC coupler which can provide a high DC level shift.

It is yet a further object of this invention to provide a DC coupler which is relatively free of the effects of harmonics.

It is a still further object of this invention to provide a high level DC coupler which is relatively small and inexpensive and yields highly efficient results.

Objects and advantages of this invention can be appreciated from the following drawings in which:

DESCRIPTION OF THE PREFERRED EMBODIMENTS

Figure 1:
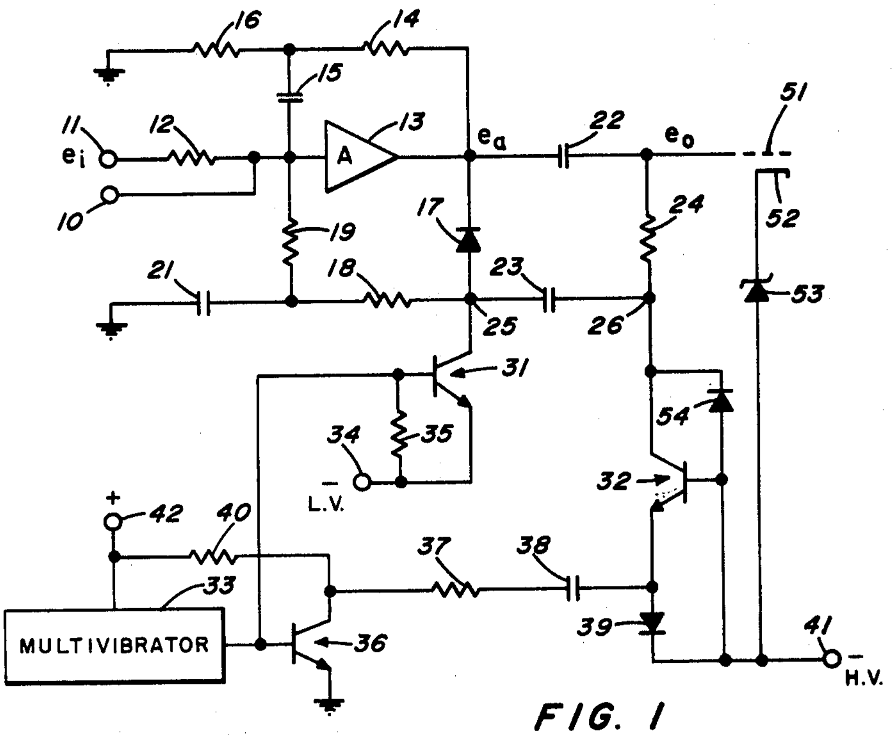
FIG. 1 shows a circuit diagram of the invention.

Referring now to the drawings and in particular FIG. 1, operational amplifier 13 has a plurality of input terminals 10 and 11. Input terminal 11 is connected through resistor 12 to the amplifier. Input 10 can be used to impose a DC bias signal. Resistors 14 and 16 and capacitor 15 provide an AC feedback path for the amplifier while resistors 18 and 19 and capacitor 21 form a DC feedback path through diode 17. Capacitors 22, 23 and resistor 24 are connected to receive the output of the amplifier.

A potential is applied across capacitor 23 through NPN transistors 31 and 32. These are in turn cyclically controlled by multivibrator 33 which operates in the range o of 10,000 cps. Transistor 31 has a bias resistor 35 connected in its base-emitter path and is operative to apply a low potential DC signal (L.V.) at 34 to one plate of capacitor 23. The low voltage signal is generally in the order of −150 to −350 volts.

A high DC potential (H.V.), generally −6000V, at terminal 41 is connected to the other plate through transistor 32. Operation of transistor 32 is controlled by multivibrator 33 through the series circuit comprising transistor 36, resistor 37, capacitor 38 and a diode 39. Transistor 36 is biased by a positive potential source which is connected to terminal 42 through resistor 40. This bias source also serves multivibrator 33.

The output of the coupler is shown connected to the grid 51 of a cathode ray tube. The cathode 52 of this tube is connected to terminal 41 through breakdown diode 53. Diode 54 provides a discharge path for leakage current from the tube.

In operation an AC and DC signal is received by the operational amplifier through terminal 11 and resistor 12. The DC level of this signal can be adjusted by a DC signal received through terminal 10. The amplification of the input signal is controlled by the amplifier through two feedback paths. In the first path resistor 14 and capacitor 15 feed back an AC signal. Resistor 16 serves to drain off DC Resistors 18 and 19 feed back DC in the second path and capacitor 21 passes AC to ground.

The high potential DC shift is applied to the output of the amplifier and is controlled by transistors 31 and 32. Both transistors are simultaneously turned on to apply the L.V. potential and the H.V. potential across capacitor 23.

Initially assuming the two transistors to be turned off, capacitor 38 is charged by the H.V. potential through terminal 41, diode 39, resistors 37, 40 and terminal 42. This sets up a potential between the emitter and base of transistor 32.

When the multivibrator generates a positive pulse, it is first applied to the base of transistor 31. Transistor 31 is thereby turned on and the L.V. potential of terminal 34 is applied to one plate of capacitor 23. The positive pulse from the multivibrator also turns on transistor 36 to provide a discharge path for capacitor 38. As capacitor 38 begins to discharge a potential drop is established across the emitter-base path of transistor 32. This drop turns on transistor 32 and the H.V. potential is applied to the other plate of capacitor 23.

After a few cycles of operation capacitor 22 will charge up to the potential applied across capacitor 23. The output voltage $e_o$ at the grid 51 will then be equal to $e_a$ minus the voltage across the capacitor 22, that is:

$e_a-(\text{L.V.}-\text{H.V.})$ Thus the output signal obtained is the amplified input signal $e_a$ with a DC level of H.V. − L.V.

Figure 2:
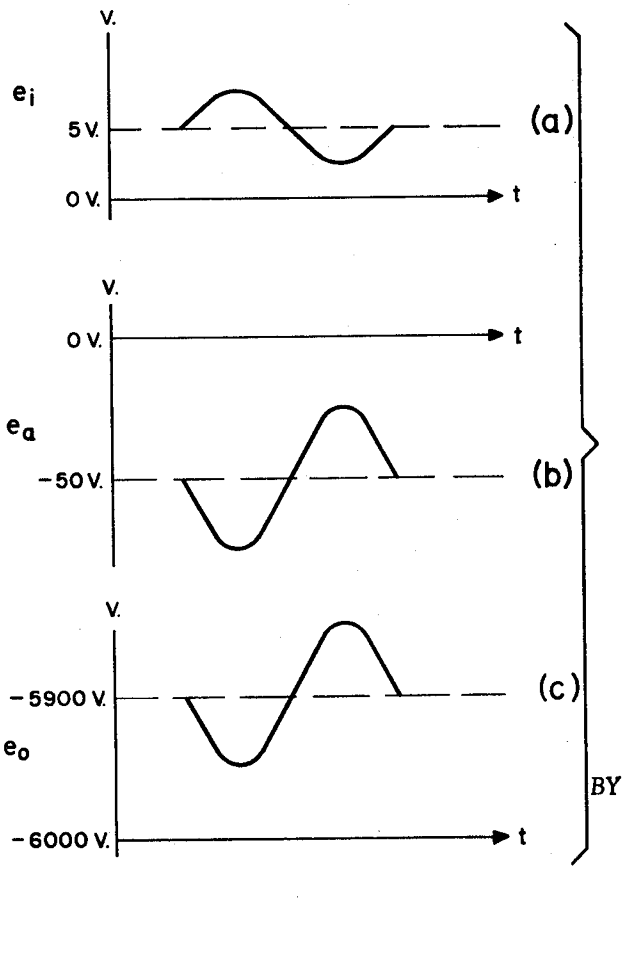
FIG. 2 shows a plurality of waveforms at various points in the circuit.

The output of the circuit may be more clearly seen by references to FIGS. 2*a* to *c* which show the waveforms at various points in the circuit. Actual values for the DC levels have been chosen for clarity of description. These values are chosen only by way of example. FIG. 2*a* shows the input signal $e_i$ to the amplifier which is a composite AC and DC signal introduced at terminal 11. In FIG. 2*b* the amplified signal $e_a$ is shown. It should be noted that the DC level as well as the AC amplitude of the input signal has been amplified. The output voltage $e_o$ is seen in FIG. 2*c* to be the amplified signal $e_a$ having a DC level shift of H.V. − L.V. in which H.V. is −6,000V and L.V. is −150V.

It should also be noted that the figures that the noise signal generated by the cyclic switching of transistors 31 and 32 has been eliminated from the output signal. This results because the noise signal from transistor 31 is fed back to amplifier 13 through resistors 18 and 19 and appears as part of the output $e_a$ of the amplifier. This in turn will cancel out the noise signal from transistor 32 at terminal 26 insuring that the output signal is free of noise.

It is seen therefore that a DC coupling circuit which is capable of providing a high DC level shift has been provided.

Obviously many modifications and variations of the present invention are possible in the light of the above teachings. It is therefore to be understood that within the scope of the appended claims the invention may be practiced otherwise than as specifically described.

I claim:

1. A direct current coupling circuit comprising:

amplifying means;

capacitive means including first and second capacitors, said capacitive means having first and second terminals and connected at the first terminal to the output of said amplifier;

a potential source means including first and second bias means, a first diode means, and a third capacitor, said potential source means having first and second terminals;

first and second switching means comprising first and second transistors;

said first switching means being connected between the first terminal of said capacitive means and said potential source means;

said second switching means being connected between the second terminal of said capacitive means and said potential source means;

cyclic means comprising a multivibrator connected to said first and second switching means; and an output terminal connected to the other side of said capacitive means.

2. A direct current coupling circuit as in claim 1 wherein:

said capacitive means further includes a second diode connected between one side of each of said first and second capacitors; and the other side of said capacitors are connected together.

3. A direct current coupling circuit as in claim 2 wherein:

said first transistor has an emitter, a collector and a base;

the emitter of said first transistor being connected to said first bias means;

the collector of said first transistor being connected to the junction of said second diode and said second capacitor; and the base of said first transistor being connected to said multivibrator.

4. The direct current coupling circuit as in claim 3 wherein:

said second bias means, said first diode and said third capacitor are connected in series with said multivibrator;

said second transistor has an emitter, a collector, and a base;

the emitter of said second transistor is connected in the series circuit between said third capacitor and first diode;

the collector of said second transistor is connected to the junction of said first and second capacitor; and the base of said second transistor is connected to said second bias source.

5. The direct current coupling circuit as in claim 4 wherein:

said amplifying means comprises an operational amplifier having a plurality of feedback paths.